United States Patent
Miliavsky et al.

(10) Patent No.: US 9,049,157 B1
(45) Date of Patent: Jun. 2, 2015

(54) METHOD AND DEVICE FOR IMPROVING SCALABILITY OF LONGEST PREFIX MATCH

(75) Inventors: Vladimir Miliavsky, Petach Tikva (IL); Ben Sheffi, Natanya (IL)

(73) Assignee: Compass Electro-Optical Systems Ltd, Natanya (IL)

( * ) Notice: Subject to any disclaimer, the term of this patent is extended or adjusted under 35 U.S.C. 154(b) by 628 days.

(21) Appl. No.: 12/541,950

(22) Filed: Aug. 16, 2009

(51) Int. Cl.
*G11C 15/00* (2006.01)
*H04L 12/743* (2013.01)
*H04L 12/745* (2013.01)

(52) U.S. Cl.
CPC ......... *H04L 45/7457* (2013.01); *H04L 45/748* (2013.01)

(58) Field of Classification Search
None
See application file for complete search history.

(56) References Cited

U.S. PATENT DOCUMENTS

| | | | | |
|---|---|---|---|---|
| 6,502,163 | B1* | 12/2002 | Ramankutty | 711/108 |
| 6,947,931 | B1* | 9/2005 | Bass et al. | 1/1 |
| 7,054,993 | B1 | 5/2006 | Srinivasan et al. | |
| 7,299,317 | B1 | 11/2007 | Panigrahy et al. | |
| 7,571,156 | B1* | 8/2009 | Gupta et al. | 1/1 |
| 7,933,282 | B1* | 4/2011 | Gupta et al. | 370/412 |
| 2001/0042130 | A1* | 11/2001 | Brown | 709/238 |
| 2003/0093616 | A1* | 5/2003 | Slavin | 711/108 |
| 2004/0100950 | A1* | 5/2004 | Basu et al. | 370/389 |
| 2004/0170170 | A1* | 9/2004 | Joung et al. | 370/389 |
| 2005/0083937 | A1* | 4/2005 | Lim | 370/392 |
| 2006/0167843 | A1* | 7/2006 | Allwright et al. | 707/3 |
| 2006/0176721 | A1* | 8/2006 | Kim et al. | 365/49 |
| 2006/0262583 | A1 | 11/2006 | Venkatachary | |
| 2007/0136331 | A1 | 6/2007 | Hasan et al. | |
| 2007/0186036 | A1 | 8/2007 | Bittner | |
| 2009/0150603 | A1* | 6/2009 | Sahni et al. | 711/108 |

FOREIGN PATENT DOCUMENTS

JP 2002-208945 A 7/2002

OTHER PUBLICATIONS

Francis Zane et al. "CoolCAMs: Power-Efficient TCAMs for Forwarding Engines." 2003. IEEE. INFOCOM 2003.*
Haibin Lu. "Improved Trie Partitioning for Cooler TCAM." 2004. ACTA Press. IASTED 2004.*
Weirong Jiang and Viktor K. Prasanna. "Multi-Way Pipelining for Power-Efficient IP Lookup." 2008. IEEE. GLOBECOM 2008.*
Heeyeol Yu et al. "Power-Saving Hybrid CAMs for Parallel IP lookups." 2008. ICNP 2008 poster session.*
Devavrat Shah and Pankaj Gupta. "Fast Updating Algorithms for TCAMs." Jan. 2001. IEEE. IEEE Micro. vol. 21. No. 1. pp. 36-47.*

(Continued)

*Primary Examiner* — Nathan Sadler
(74) *Attorney, Agent, or Firm* — Wilmer Cutler Pickering Hale and Dorr LLP

(57) ABSTRACT

A Ternary Content Addressable Memory (TCAM)-based Longest Prefix Match (LPM) lookup table including a TCAM holding a plurality of prefix entries for looking up results in an associated RAM, the associated RAM storing results corresponding to TCAM match indices; additional Random Access Memory (RAM) storing results from the associated RAM; and one entry in the TCAM representing at least two entries in the additional RAM from the associated RAM, whereby at least one entry in the TCAM is made available.

21 Claims, 3 Drawing Sheets

(56) References Cited

OTHER PUBLICATIONS

Wang P-C et al: "Efficient Entry-Reduction Algorithm for TCAM-Based IP Forwarding Engine" IEE Proceedings: Communications Institution of Electrical Engineers, GB vol. 152, No. 2 , Apr. 8, 2005 pp. 172-176, XP006023920, ISSN: 1350-2425, DOI: 10.1049/IP-COM; 20041153—*Whole section 3*.

Wei Lin et al: "A TCAM Index Scheme for IP Address Lookup" Communications and Networking in China 2006. CHINACOM '2006 First International Conference on, IEEE, PI Oct. 1, 2006, pp. 1-5, XP031074707, ISBN: 978-1-4244-0462-9 *Abstract* *Whole section 3*.

European Search report mailed on Nov. 12, 2010 for European Patent 10008515.8 filed on Aug. 16, 2010—6 pages.

International Search Report and Written Opinion mailed Dec. 23, 2010 for International Application No. PCT/IL10/00661 filed Aug. 16, 2010 (10 pages).

Office Action issued by the Japanese Patent Office for Application No. 2012-525250, mailed Jul. 7, 2014, 5 pgs.

* cited by examiner

METHOD AND DEVICE FOR IMPROVING SCALABILITY OF LONGEST PREFIX MATCH

FIELD OF THE INVENTION

The present invention relates to a method and device for improving the scalability of devices performing longest prefix match.

BACKGROUND OF THE INVENTION

Longest Prefix Match (LPM) is a problem of finding the longest prefix among a number of prefixes stored in a data base that matches a given lookup key. LPM can be used in many applications and is not limited to IP routing, but since IP routing is one of the major LPM applications, the present invention will be discussed in a context of IP routing, by way of non-limiting example, only.

A Forwarding Information Base (FIB), also known as a forwarding table, is most commonly used in network bridging, routing, and similar functions, to find the proper interface to which the input interface should send a packet to be transmitted by the router. Thus, a FIB contains a set of prefixes with corresponding output interfaces. A forwarding decision is made by finding the longest prefix matching the lookup key. The most commonly used lookup key at present is the IPv4 or IPv6 destination address of the packet.

A FIB, or other device for performing LPM, can be implemented with Random Access Memories (RAM) by using algorithms, such as M-Trie, Bitmap Tree, etc., or with fast hardware lookup mechanisms, such as Ternary Content Addressable Memories (TCAM). While advanced RAM-based FIB implementations/algorithms are scalable enough to hold millions of prefixes, they are not scalable from the lookup key width perspective, as the number of accesses to FIB memory depends on the lookup key width. In general, the wider the key, the more lookups are required.

With TCAM-based FIB or LPM implementation, the lookup time is constant. However, TCAM-based FIB is not scalable in terms of the number of prefixes. The most advanced TCAM device known today has a capacity of 40 Mbit, which can be used to hold up to 0.5M prefixes.

Accordingly, there is a long felt need for a method and apparatus for performing longest prefix match lookup that is scalable both in terms of the number of prefixes and in terms of the lookup key width.

SUMMARY OF THE INVENTION

The proposed solution is to improve LPM scalability by utilizing a TCAM device with its associated results RAM, adding an additional RAM, and inserting entries to the TCAM that stand for multiple entries in the additional RAM. The solution can also be used to hold a LPM lookup-table of a certain scale in fewer TCAM entries than in the conventional manner. In this way, it is possible either to use a smaller TCAM device or to free more TCAM entries for possible use by other applications.

There is provided according to the present invention a method for building a Longest Prefix Match lookup table including arranging a plurality of prefix entries in a TCAM and inserting results corresponding to TCAM match indices into an associated results RAM, the method including selecting a group of at least two prefix entries that can be reduced to a single entry in the TCAM, which single entry consists of a common prefix for all prefix entries in the group, arranging results from the associated RAM represented by the group of prefixes in additional RAM, replacing the group of prefix entries in the TCAM with the single TCAM entry pointing to multiple results in the additional RAM, thereby making available at least one entry in the TCAM, and replacing the entries in the associated RAM by an entry pointing to the entries in the additional RAM.

There is further provided, according to the invention, a method for performing Longest Prefix Match (LPM) lookup, the method including building and maintaining a lookup table including a TCAM and associated results Random Access Memory (RAM), and additional RAM, wherein at least two entries in the additional RAM are represented by one entry in the TCAM, performing a lookup in the TCAM, finding a results for an entry in the TCAM in the associated results RAM pointing to a group of results in the additional RAM, and, in response thereto, completing the lookup by reading an entry in the group of results in the additional RAM.

There is also provided according to the invention, a Ternary Content Addressable Memory (TCAM)-based Longest Prefix Match (LPM) lookup table including a TCAM holding a plurality of prefix entries for looking up results in an associated RAM, the associated RAM storing results corresponding to TCAM match indices, additional Random Access Memory (RAM) storing results from the associated RAM, and one entry in the TCAM representing at least two entries in the additional RAM from the associated RAM, whereby at least one entry in the TCAM is made available

BRIEF DESCRIPTION OF THE DRAWINGS

The present invention will be further understood and appreciated from the following detailed description taken in conjunction with the drawings in which.

DETAILED DESCRIPTION OF THE INVENTION

Figures 1A, 1B:
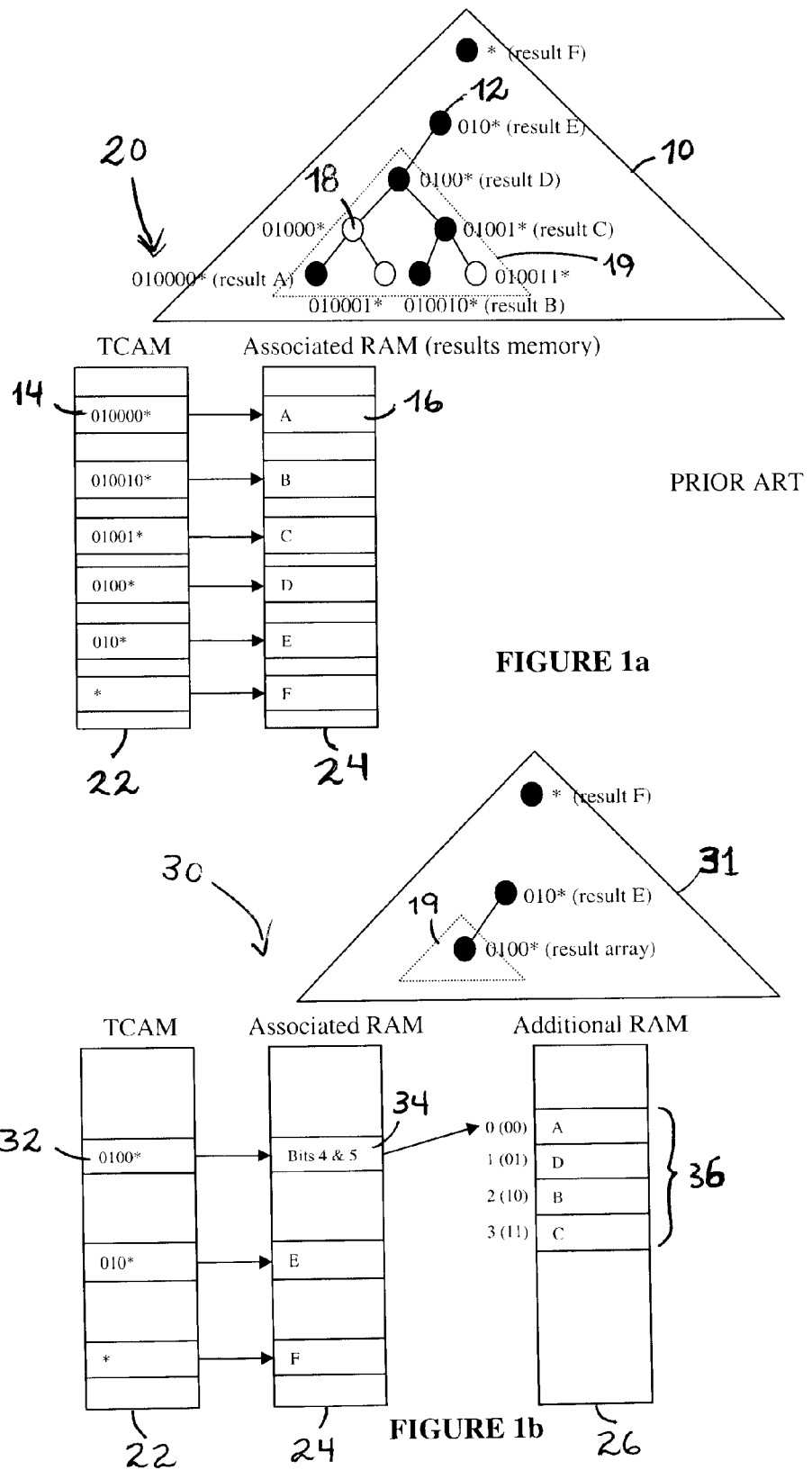
FIG. 1a is a schematic illustration of representation of LPM device entries by TCAM entries, in accordance with the prior art.
FIG. 1b is a schematic illustration of representation of the LPM entries of FIG. 1a by TCAM and additional RAM entries, in accordance with one exemplary embodiment of the present invention.

The present invention relates to a method and apparatus for performing longest-prefix-match lookup, using a TCAM (with its associated RAM serving as a results memory) and additional RAM, in order to achieve better scale (for the number of entries) than in standard TCAM-based solutions. The method improves LPM scalability by storing a portion of the results data in the RAM associated with the TCAM and a portion of the data in the additional RAM, and inserting entries to the TCAM that stand for multiple entries in the additional RAM, thereby making available in the TCAM entries that would be occupied in conventional TCAM-based devices.

In conventional TCAM based LPM solutions, each LPM entry is represented by one TCAM entry, which points to a result in an associated results memory (the associated RAM). In the present invention, a group of LPM entries can be represented by a single TCAM entry, whose prefix is a common prefix of all the entries in that group. In this case, the respective result in the associated RAM points to an array of results in the additional RAM, which contains the results of each entry in that group of LPM entries.

The entries in the additional RAM can then be searched using a narrow portion of the lookup key, whereby results can be obtained in a single RAM access. In this way, some of the results in the results memory will be found during the lookup in the TCAM and some of the results will be found during the subsequent lookup in the additional RAM. It will be appreciated that, if desired, one (or more) further additional RAM access can be provided, i.e., several layers of RAM arrays can be enabled, one pointing to the other An algorithm that uses multiple levels of RAM might achieve better scale for LPM entries for certain sizes of TCAM and RAM. The disadvantage of this arrangement is the lookup time, since multiple RAM accesses will be performed.

A TCAM entry, whose prefix is of some length M, may refer to an array of results in the additional RAM that contains all the possible prefixes of length M+N that match this TCAM entry. Such an array will contain $2^N$ entries (which is the number of prefixes of length M+N that match a certain prefix of length M), and will represent all the LPM entries with prefixes of lengths M to M+N, inclusive, that match the prefix (of length M) of the TCAM entry that points to the array. When a group of LPM entries can be represented in the TCAM by a single entry, the group of results is moved from the associated results RAM to the additional RAM. The LPM entries whose results are represented in the array in the additional RAM can be removed from the TCAM and replaced by a single entry pointing to a new result in the associated results RAM which, in turn, points to the corresponding array in the additional RAM, thus allowing representation of a larger LPM lookup table with a given TCAM size. A subsequent lookup in the corresponding additional RAM array will only be over bits M to (M+N−1), so that results can be obtained during a single access of the additional RAM.

The result in the associated RAM entry indicated by the TCAM lookup no longer contains the original results (which are now in the additional RAM) but contains three parameters permitting reading of the actual results—start bit, stride size and an index calculated based on the lookup key, start bit and stride size. These parameters indicate the location of the start of the array in the additional RAM and the relevant bits of the look up key (for example, the relevant bits of the IP address, in a FIB) over which the lookup in the additional RAM is performed, that should be used to retrieve the index inside the array in the additional RAM. Typically, the relevant bits are bits M through (M+N−1) of the lookup key. The LPM lookup is completed by reading an entry in the additional RAM corresponding to the calculated index within the array pointed to by the TCAM match index. The result address is calculated according to these values and fetched from the additional RAM memory.

The results for TCAM entries that are not grouped together in arrays can be placed in the results RAM associated with the TCAM. One of the bits in the result in the associated results RAM may be used to indicate whether the rest of the result (in associated RAM) is the actual result, or contains a pointer to an array in the additional RAM where the actual result stands, as explained above. While this method is not mandatory, it is useful in order to avoid the additional memory access when the result prefix is not grouped in an array.

For purposes of the present application, for an array with $2^N$ entries, N is referred to as the array's stride size. Thus, a TCAM entry with prefix-length M that points to an array with stride size N stands for up to $(2^{N+1}-1)$ LPM entries of length ranging from M to M+N, inclusive. It will be appreciated that several stride-sizes may be supported and arrays of different sizes can coexist in the additional RAM.

The software algorithm that is responsible for the creation of the LPM table is also responsible for spotting candidate prefixes for creation of arrays, and deciding to create new arrays or to decompose existing arrays. One possible way to choose which arrays should be created is to prioritize candidate arrays by their "utilization", which is defined as the ratio between the number of TCAM entries that can be reduced when creating the array, and the array size ($2^N$ for an array with stride size of N).

When prioritizing according to 'utilization', for example, a possible implementation involves using global utilization thresholds, so that candidate arrays with utilization higher than a certain threshold are created, and existing arrays whose utilization falls below some other threshold are decomposed and their LPM entries are returned to the TCAM individually. Since the lookup table can change over time, especially in the case of FIB tables, these arrays can be created and decomposed during operation. In this exemplary implementation, the values of the utilization thresholds can be optimized by performing tests on the specific application using the LPM lookup, and will also be highly influenced by the ratio between the available TCAM size and the available RAM size dedicated for the use of the algorithm. The larger the RAM size compared to the TCAM size, the lower the utilization threshold that can be allowed.

For example, looking at IP routing, tests show that, utilizing the distribution of Internet IPv4 entries in the forwarding table of the Internet in April 2009, the method of the present invention could achieve the following scale results:

| Ratio between additional RAM entries to TCAM entries | Ratio between number of FIB entries that can be achieved using the proposed algorithm to number of TCAM entries |
| --- | --- |
| 8:1 | ~3.3:1 |
| 4:1 | ~2.65:1 |
| 2:1 | ~1.67:1 |

Looking at the middle line in the table, for example, if the additional RAM memory (used to store the prefix arrays) has 4 times the number of entries that the TCAM has, the algorithm can improve the scale of the number of prefixes in the FIB table by ~2.65 times compared to a conventional TCAM solution. Putting numbers to the example, using a TCAM device that can hold 1M entries and an additional RAM memory with 4M entries, the algorithm can achieve a scale of ~2.65M FIB entries Referring to FIG. 1a, there is shown a schematic illustration of an LPM table, here illustrated as a FIB table 20, illustrating the representation of a plurality of FIB entries by TCAM entries, in accordance with one example of the prior art. As can be seen, each FIB entry 12 (illustrated as black dots in the FIB table trie 10) is represented by one entry 14 in the TCAM 22, which points to a result (A to E) 16 in the associated results RAM 24. Nodes 18 (illustrated as white dots in the FIB table trie 10) are not real FIB entries, they merely show junctions in the FIB table trie, so do not appear in the TCAM.

FIG. 1*b* is a schematic illustration of a representation of a FIB table 30 representing a FIB table trie 31, corresponding to the FIB table trie 10 of FIG. 1*a*, in accordance with one exemplary embodiment of the present invention. FIB table 30 includes a TCAM 22 with its associated results RAM 24 and additional RAM 26. The small dotted triangles 19 on FIGS. 1*a* and 1*b* indicate the candidate portion of the FIB trie that can be reduced to a single TCAM entry (i.e., removed to the additional RAM for searching therein). The corresponding results from the associated results memory are now stored in an array 36 (A,B,C,D) in the additional RAM 26. Thus, in FIG. 1*b*, a single TCAM entry 32, prefix 0100* in TCAM 22, replaces the 4 former TCAM entries 0100*, 01001*, 010000* and 010001*, thereby leaving three entries available in the TCAM. Preferably, the prefix in the TCAM that replaces the group of prefixes is the common prefix of all the entries in the group.

The result 34 now retrieved by the TCAM lookup contains the location of the start of the array 36 in the additional RAM and the relevant bits of the entry (e.g., IP address) over which the lookup is performed, so as to retrieve the index inside the array (here illustrated as bits 4 and 5). The utilization of the reduction shown in this example is the number of TCAM prefixes that become available, here 3, divided by the size of the array, which is $2^2=4$. Thus, this reduction has a utilization of ¾ or 75%.

Figure 2A:
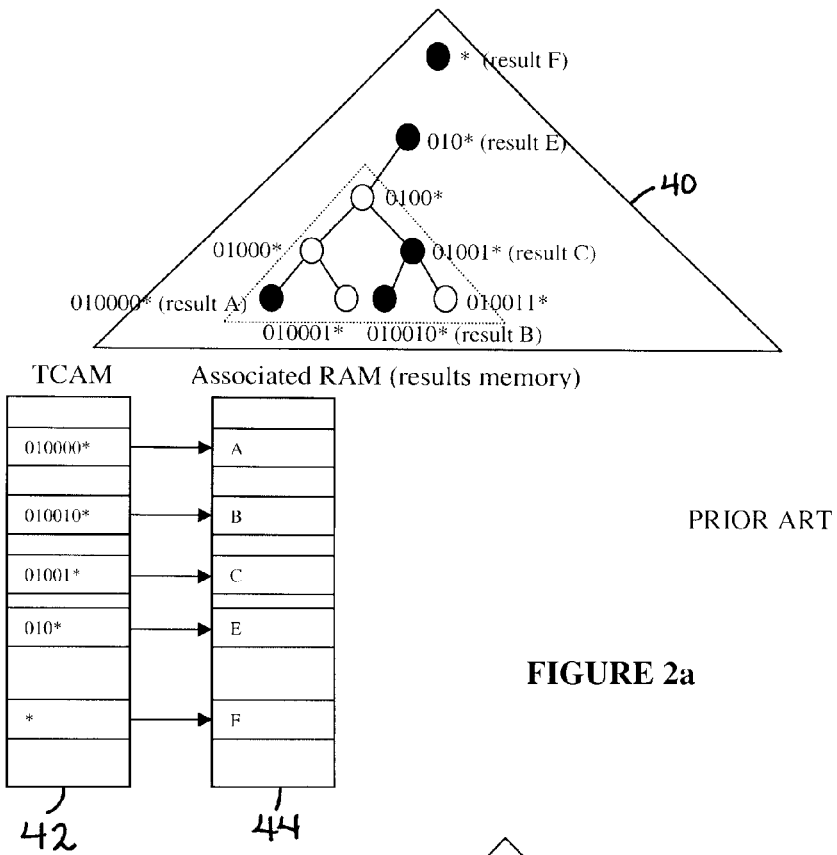
FIG. 2a is a schematic illustration of representation of LPM device entries by TCAM entries, in accordance with another example of the prior art.

FIG. 2*a* is a schematic illustration of representation of LPM device entries by TCAM entries, in accordance with another example of the prior art. This FIB table trie 40 is similar to trie 10 in FIG. 1*b*, except that node 0100* is not a real FIB entry. In a conventional TCAM based LPM device, the entries of trie 40 are stored in a TCAM 42 and an associated results memory 44. Since prefix 0100* is not a real FIB entry, both the TCAM 42 and the results memory 44 contains one fewer entry than in FIG. 1*a*.

Figure 2B:
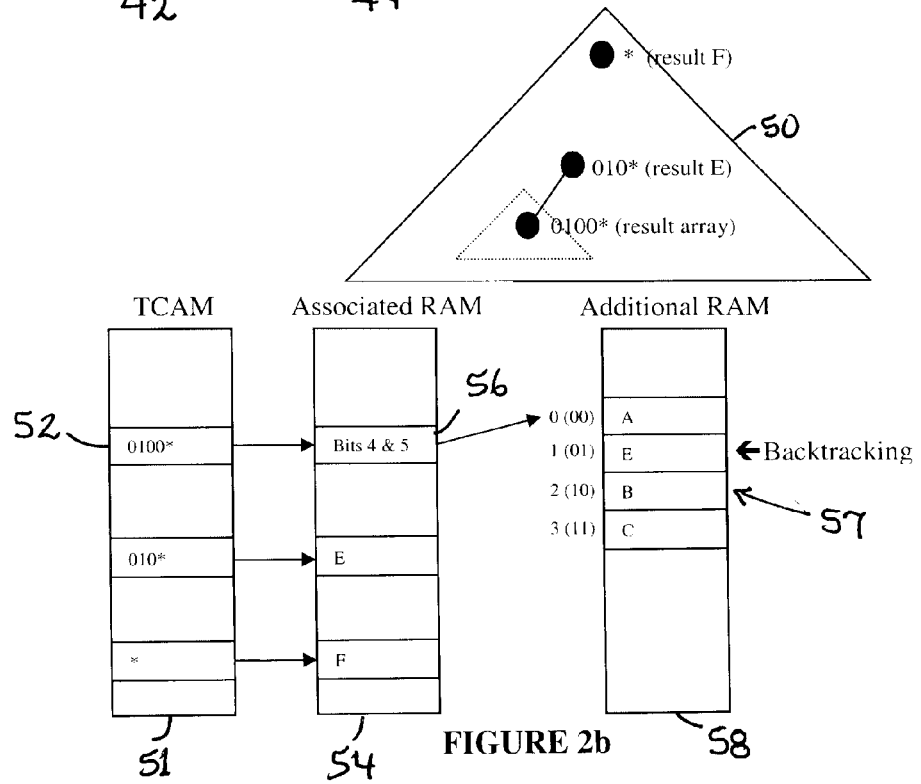
FIG. 2b is a schematic illustration of representation of the LPM entries of FIG. 2a by TCAM and additional RAM entries, in accordance with another exemplary embodiment of the present invention.

Referring now to FIG. 2*b*, there is shown a representation of the LPM entries of FIG. 2*a* by TCAM and additional RAM entries, in accordance with another exemplary embodiment of the present invention, illustrated in FIB table trie 50. Despite the fact that prefix 0100* is not a real FIB entry, it can still be used in reduction of a candidate portion of the trie. Thus, instead of 5 entries, in TCAM 51 there are three entries. Entry 52 is the 0100* prefix which points to result 56 in the associated results RAM 54. The results in the results RAM corresponding to the TCAM entries that were reduced are stored in array 57 in the additional RAM 58. As can be seen, the array in additional RAM 58 includes a prefix 010001* that is not represented by an LPM entry in the group of entries reduced to the array. In this case, the array will contain a "backtracking" result, i.e., the result of the first node above it in the LPM table trie which is a real node, here 010*, result E. In other words, according to the invention, if the array includes a prefix of length M+N that is not represented by any LPM entry in the reduced group, the array will contain a backtracking result, i.e., a duplication of the result of the longest prefix in the table that is a sub-prefix of M+N and has length less than M. It will be appreciated that, in this case, while the array size is also $2^2=4$, the number of TCAM prefixes is reduced only by 2, thus, this reduction has a utilization of 2/4 or 50%.

Figure 3A:
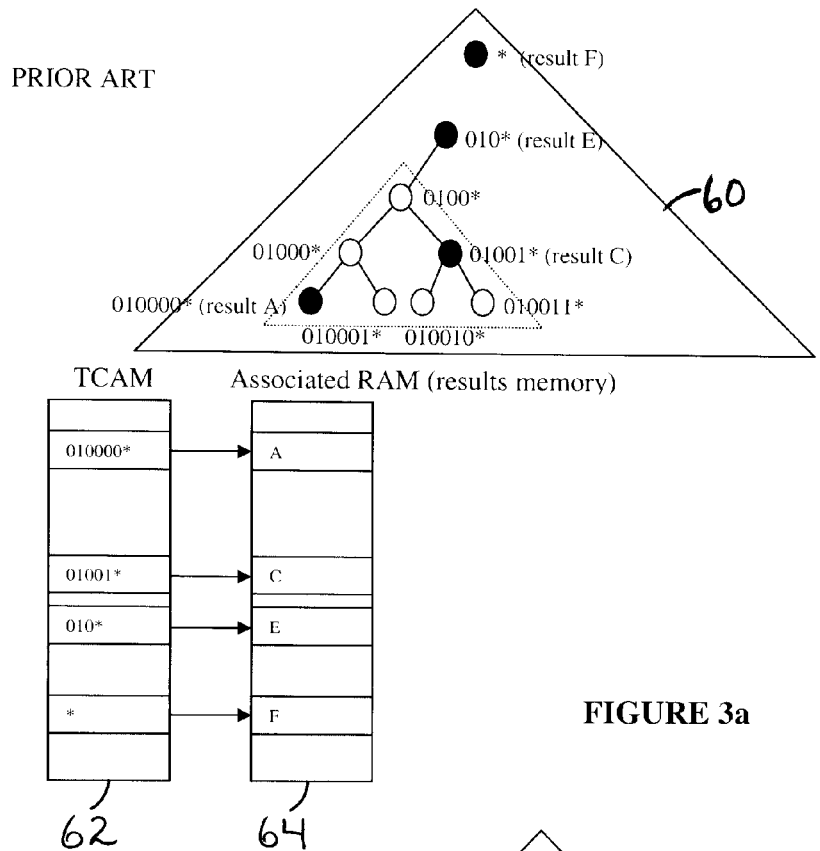
FIG. 3a is a schematic illustration of representation of LPM device entries by TCAM entries, in accordance with another example of the prior art.

FIG. 3*a* is a schematic illustration of representation of LPM device entries by TCAM entries, in accordance with a further example of the prior art. This FIB table trie 60 is similar to trie 40 in FIG. 2*b*, except that node 010010* is not a real FIB entry. In a conventional TCAM based LPM device, the entries of trie 60 are stored in a TCAM 62 and an associated results memory 64. Since prefix 010010* is not a real FIB entry, both the TCAM 62 and the results memory 64 contains one fewer entry than in FIG. 2*a*.

Figure 3B:
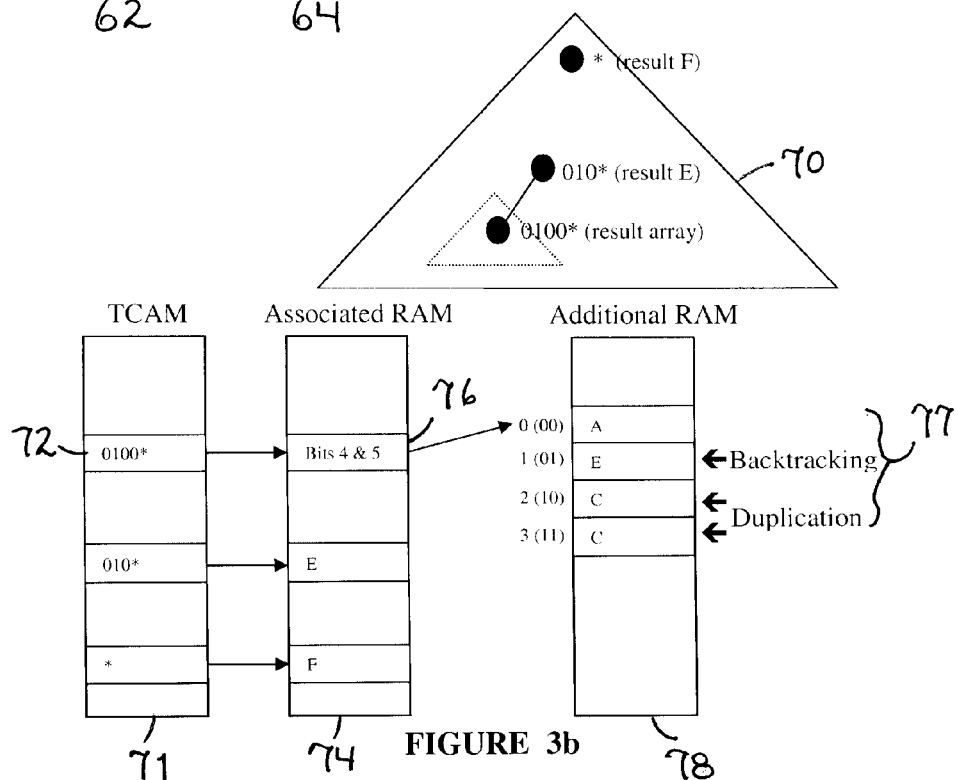
FIG. 3b is a schematic illustration of representation of the LPM entries of FIG. 3a by TCAM and additional RAM entries, in accordance with a further exemplary embodiment of the present invention.

FIG. 3*b* is a schematic illustration of representation of the LPM entries of FIG. 3*a* by TCAM and additional RAM entries, in accordance with a further exemplary embodiment of the present invention, illustrated in FIB table trie 70. In this example, there are also three entries in TCAM 71. Here, too, entry 72 is the 0100* prefix which points to result 76 in the associated results RAM 74. The results in the results RAM corresponding to the TCAM entries that were reduced are stored in array 77 in the additional RAM 78. As can be seen, the array in additional RAM 78 includes two additional prefixes 010010* and 010011* that are not represented by any LPM entry. In this case, the array will contain a "duplication" result, i.e., both of these entries will have the same result, result C. In other words, according to the invention, an LPM entry with prefix-length less than M+N that is represented in the array may be duplicated to several results in the array that stand for all the possible prefixes of length M+N represented by this prefix, unless there is a more specific prefix (i.e., of longer length) in the array that represents this M+N prefix. As can be seen, in this case, while the array size is also $2^2=4$, the number of TCAM prefixes is reduced only by 1, thus, this reduction has a utilization of ¼ or 25%.

To sum up, an LPM lookup is performed on the LPM device of the present invention as follows. First, a TCAM lookup is performed, for a given key, in the TCAM of the LPM device. An associated results RAM entry corresponding to the TCAM match index is read, and an index is calculated, based on the lookup key and two parameters (start bit and stride size) in the associated results RAM entry. The LPM lookup is completed by reading an entry in the additional RAM corresponding to the calculated index within the array pointed to by a third parameter from the associated results RAM entry. This additional RAM entry contains the application specific result for the longest prefix matching the given key.

The LPM table is maintained by adding new prefixes to the table and removing old prefixes from the table, as required. A new prefix can be added to the table in one of three ways. First, as in conventional LPM tables, a new entry can be added to the TCAM for a given prefix, and the result is written into the corresponding result RAM entry. Alternatively, if a suitable array has already been created in additional RAM, the prefix result can be added to the corresponding entry in the existing array in the additional RAM. If appropriate, and if no corresponding array exists, a new array can be created in the additional RAM, containing the new prefix results with some of the existing prefix results. The new common prefix result, pointing to the newly created array, is written into the results RAM and the new common prefix is added to the TCAM. Any existing array corresponding to the prefixes included in the new array are now decomposed and all the respective resources (e.g., TCAM resources) are returned to TCAM and associated results RAM.

A prefix result can be updated by overwriting the old result in the results RAM entry or in additional RAM entries.

An old prefix can be removed from the table by either overwriting the prefix result in the corresponding additional RAM entry by the result of the longest prefix matching the deleted prefix, or by invalidating the corresponding TCAM entry for the given prefix so that it no longer participates in the lookup.

While the invention has been described with respect to a limited number of embodiments, it will be appreciated that many variations, modifications and other applications of the invention may be made. It will further be appreciated that the invention is not limited to what has been described hereinabove merely by way of example. Rather, the invention is limited solely by the claims which follow.

The invention claimed is:

1. A Ternary Content Addressable Memory (TCAM)-based Longest Prefix Match (LPM) lookup table comprising:
 a TCAM, an associated Random Access Memory (RAM) and an additional RAM;
 the TCAM configured to store a TCAM entry referencing an LPM entry in the associated RAM and a TCAM entry corresponding to a common prefix of a plurality of LPM entries, wherein the plurality of LPM entries is selected by, in response to incremental changes in LPM entries, prioritizing based on the incremental changes candidate array entries corresponding to combination of LPM entries;
 the TCAM further configured to remove a plurality of TCAM entries each corresponding to one of said plurality of selected LPM entries other than said TCAM entry corresponding to said common prefix;
 the associated RAM configured to store a results entry corresponding to said stored TCAM entry and to overwrite results entries associate with each of said removed TCAM entries; and
 the additional RAM configured to store an array entry selected from the candidate array entries, the selected array entry corresponding to the combination of said plurality of selected LPM entries and including results entries corresponding to the overwritten results entries;
 wherein said LPM lookup table, after the TCAM removes the plurality of TCAM entries, still includes at least one TCAM entry referencing an LPM entry in the associated RAM.

2. A method for building a Longest Prefix Match (LPM) lookup table using a Ternary Content Addressable Memory (TCAM), an associated Random Access Memory (RAM), one or more intermediate RAMs and an additional RAM, the lookup table including at least one TCAM entry referencing an LPM entry in the associated RAM and at least one TCAM entry referencing an indeterminate pointer corresponding to a plurality of LPM entries stored in the additional RAM; the method comprising:
 in response to incremental changes in LPM entries, prioritizing based on the incremental changes candidate array entries wherein each array entry corresponds to a combination of LPM entries;
 selecting based on the prioritized candidate array entries a plurality of LPM entries that have a common prefix;
 identifying, for each of said selected LPM entries, a different associated TCAM entry stored in said TCAM, each identified TCAM entry having a results entry in said associated RAM corresponding to said selected LPM entry;
 storing in said TCAM a TCAM entry corresponding to the common prefix;
 storing in said associated RAM a results entry corresponding to said TCAM entry;
 storing in said one or more intermediate RAMs intermediate pointers corresponding to said TCAM entry, wherein each intermediate pointer of each intermediate RAM points to another intermediate RAM or to the additional RAM;
 selecting an array entry from the candidate array entries, wherein the array entry corresponds to said TCAM entry corresponding to said common prefix and said plurality of LPM entries;
 adding to said additional RAM the selected array entry as a new array entry;
 removing from said TCAM each of said identified TCAM entries that is not said TCAM entry corresponding to the common prefix; and
 overwriting each of the results entries in said associated RAM that corresponds to one of said removed TCAM entries;
 wherein said LPM lookup table, after the removing from said TCAM of each of said identified TCAM entries, still includes at least one TCAM entry referencing an LPM entry in the associated RAM.

3. A method for storing data, comprising:
 providing a Longest Prefix Match (LPM) lookup table using a Ternary Content Addressable Memory (TCAM), an associated Random Access Memory (RAM) and an additional RAM, the lookup table including at least one TCAM entry referencing an LPM entry in the associated RAM and at least one TCAM entry referencing an array corresponding to a plurality of LPM entries stored in the additional RAM;
 in response to incremental changes in the LPM entries, prioritizing based on the incremental changes candidate array entries wherein each array entry corresponds to a combination of LPM entries;
 selecting based on the prioritized candidate array entries a plurality of LPM entries that have a common prefix;
 identifying, for each of said selected LPM entries, a different associated TCAM entry stored in said TCAM, each identified TCAM entry having a results entry in said associated RAM corresponding to said selected LPM entry;
 storing in said TCAM a TCAM entry corresponding to the common prefix;
 storing in said associated RAM a results entry corresponding to said TCAM entry;
 selecting an array entry from the candidate array entries, wherein the array entry corresponds to said TCAM entry corresponding to said common prefix and said plurality of LPM entries;
 adding to said additional RAM the selected array entry as a new array entry;
 removing from said TCAM each of said identified TCAM entries that is not said TCAM entry corresponding to the common prefix; and
 overwriting each of the results entries in said associated RAM that corresponds to one of said removed TCAM entries;
 wherein said LPM lookup table, after the removing from said TCAM of each of said identified TCAM entries, still includes at least one TCAM entry referencing an LPM entry in the associated RAM.

4. The method according to claim 3, further comprising adding a new LPM entry to said lookup table by:
 searching for an array in said additional RAM having a corresponding common prefix with said new LPM entry; and
 if said array is found, adding a result corresponding to said new prefix entry into said array.

5. The method according to claim 3, further comprising adding a new LPM entry to said lookup table by adding a new TCAM entry into said TCAM and storing a result corresponding to the new TCAM entry into said associated results RAM.

6. The method according to claim 3, further comprising adding a new LPM entry to said lookup table by:
storing a new TCAM entry into said TCAM;
storing a new array in the additional RAM containing results corresponding to a match index of at least one existing prefix entry in said TCAM and results corresponding to a match index of said new prefix entry; and
storing a new results entry in said associate RAM pointing to said new array.

7. The method according to claim 3, further comprising deleting an LPM entry from the lookup table by overwriting an entry in the additional RAM corresponding to said deleted LPM entry with a new entry of a longest prefix matching said deleted LPM entry.

8. The method according to claim 3, further comprising:
deleting an LPM entry from the lookup table by invalidating a corresponding TCAM entry;
updating the lookup table by overwriting a corresponding results entry in the associated RAM or a corresponding entry in the additional RAM.

9. The method according to claim 3, further comprising providing a bit in each results entry in said associated RAM indicating whether said entry contains lookup table results or a pointer to lookup table results in said additional RAM.

10. The method according to claim 3, wherein:
said step of selecting based on the prioritized candidate entries includes selecting more than one pluralities of LPM entries; and
said step of storing in said additional RAM includes storing data arrays corresponding to the more than one pluralities of LPM entries.

11. The method according to claim 3, comprising:
performing a TCAM lookup for a given key to find a TCAM match index;
reading a results entry from the associated RAM corresponding to said TCAM match index, said results entry corresponding to said TCAM match index including start bit and stride size;
calculating an index based on the lookup key and said start bit and stride size from results entry corresponding to said TCAM match index; and
completing an LPM lookup by reading from the additional RAM an entry corresponding to said calculated index.

12. The method according to claim 3, wherein the candidate array entries are prioritized according to the number of TCAM entries that are reduced when creating an array entry and according to the array entry size of the candidate array entries.

13. The method according to claim 3, wherein the candidate array entries are prioritized according to their utilization, wherein utilization includes a ratio between the number of TCAM entries that are reduced when creating an array entry and the array entry size.

14. The method according to claim 13, wherein the step of storing in said additional RAM the selected array entry, is performed when the utilization of the selected array entry is higher than a first threshold.

15. The method according to claim 14, further comprising optimizing the first threshold by performing tests on the application using LPM lookups.

16. The method according to claim 14, further comprising deleting from said additional RAM the stored selected array entry, when the utilization of the stored selected array entry is below a second threshold.

17. The method according to claim 16, further comprising optimizing the second threshold by performing tests on the application using LPM lookups.

18. The method according to claim 3, wherein the associated RAM is configured to contain lookup table results or a pointer to lookup table results in said additional RAM.

19. The method of claim 3, further comprising:
selecting based on the prioritized candidate array entries a second plurality of LPM entries that have a common prefix and an array entry stored in said additional RAM having results entries corresponding to said second plurality of selected LPM entries;
for each of said selected LPM entries of said second plurality of selected LPM entries
storing in said TCAM a TCAM entry corresponding to said LPM entry, and
storing in said associated RAM a results entry corresponding to said TCAM entry and to the results entry corresponding to said LPM entry in said selected array entry; and
overwriting said selected array entry in said additional RAM.

20. A method for performing Longest Prefix Match (LPM) lookup, the method comprising:
building an LPM lookup table using a Ternary Content Addressable Memory (TCAM), an associated Random Access Memory (RAM) and an additional RAM, the lookup table including at least one TCAM entry referencing an LPM entry in the associated RAM and at least one TCAM entry referencing an array corresponding to a plurality of LPM entries stored in the additional RAM, the building of the LPM lookup table comprising the steps of:
in response to incremental changes in LPM entries, prioritizing based on the incremental changes candidate array entries wherein each array entry corresponds to a combination of LPM entries;
selecting based on the prioritized candidate array entries a plurality of LPM entries that have a common prefix;
identifying, for each of said selected LPM entries, a different associated TCAM entry stored in said TCAM, each identified TCAM entry having a results entry in said associated RAM corresponding to said selected LPM entry;
storing in said TCAM a TCAM entry corresponding to the common prefix;
storing in said associated RAM a results entry corresponding to said TCAM entry;
selecting an array entry from the candidate array entries, wherein the array entry corresponds to said TCAM entry corresponding to said common prefix and said plurality of LPM entries;
adding to said additional RAM the selected array entry as a new array entry;
removing from said TCAM each of said identified TCAM entries that is not said TCAM entry corresponding to the common prefix; and
overwriting each of the results entries in said associated RAM that corresponds to one of said removed TCAM entries;
wherein said LPM lookup table, after the removing from said TCAM of each of said identified TCAM entries, still includes at least one TCAM entry referencing an LPM entry in the associated RAM;
performing a TCAM lookup in said TCAM;
finding in said associated RAM an entry corresponding to said TCAM lookup results entry pointing to an array entry in said additional RAM; and
in response thereto, completing said LPM lookup by reading an entry in said array entry.

21. The method according to claim 20, comprising:
performing a TCAM lookup for a given key to find a TCAM match index;
reading a results entry in said associated RAM corresponding to said TCAM match index, said results entry in said associated RAM corresponding to said TCAM match index including start bit and stride size;
calculating an index based on the lookup key and said start bit and stride size from said results RAM entry; and
completing the LPM lookup by reading an entry in said additional RAM corresponding to said calculated index.

\* \* \* \* \*